(12) United States Patent
Okuno et al.

(10) Patent No.: US 6,942,590 B2
(45) Date of Patent: Sep. 13, 2005

(54) BELT FABRIC, AND POWER TRANSMISSION BELT AND HIGH LOAD POWER TRANSMISSION V-BELT USING SUCH A BELT FABRIC

(75) Inventors: Shigeki Okuno, Kobe (JP); Keizo Nonaka, Kobe (JP); Kimichika Ohno, Kobe (JP)

(73) Assignee: Bando Chemical Industries, Inc., Kobe (JP)

( * ) Notice: Subject to any disclaimer, the term of this patent is extended or adjusted under 35 U.S.C. 154(b) by 152 days.

(21) Appl. No.: 10/166,249

(22) Filed: Jun. 11, 2002

(65) Prior Publication Data

US 2003/0004025 A1 Jan. 2, 2003

(30) Foreign Application Priority Data

Jun. 28, 2001  (JP) ......................................... 2001-196917

(51) Int. Cl.$^7$ ................................................ F16G 1/04
(52) U.S. Cl. ....................... 474/242; 474/266; 474/268; 474/201; 156/137
(58) Field of Search .............................. 474/260, 263, 474/268, 272, 237, 266; 156/137, 138, 333; 428/480, 506, 516, 517, 909; 399/297, 308

(56) References Cited

U.S. PATENT DOCUMENTS

| | | | | |
|---|---|---|---|---|
| 3,367,827 A | * | 2/1968 | George | ...................... 156/333 |
| 3,992,958 A | | 11/1976 | Bonnefon | |
| 4,484,903 A | * | 11/1984 | Schneider | ................... 474/242 |
| 4,918,144 A | | 4/1990 | Fukuda | |
| 5,312,869 A | | 5/1994 | Nomura et al. | |
| 5,545,097 A | * | 8/1996 | Kitazumi et al. | ........... 474/266 |
| 5,754,931 A | * | 5/1998 | Castelli et al. | .............. 399/297 |
| 5,776,023 A | * | 7/1998 | Okawa et al. | ............... 474/243 |

FOREIGN PATENT DOCUMENTS

| | | | | |
|---|---|---|---|---|
| EP | 0 674 121 A1 | 9/1995 | | |
| FR | 2-210-251 | 6/1974 | | |
| JP | (50-58202) A | * 9/1973 | ............ D06N/3/08 |
| JP | 50-47372 A | 4/1975 | | |
| JP | (55-98971) A | * 7/1980 | .......... D06M/15/72 |
| JP | 63-270753 | 11/1988 | | |
| JP | (04-34252) A | * 2/1992 | ............ F16G/1/28 |
| JP | (04-198325) A | * 7/1992 | ................. 524/114 |
| JP | 04-198326 | 7/1992 | | |
| JP | 05-271475 | 10/1993 | | |
| JP | 06-288439 | 10/1994 | | |
| JP | (07-208557) A | * 8/1995 | ............ F16G/1/28 |
| JP | (07-208558) A | * 8/1995 | ............ F16G/1/28 |
| JP | 08-216283 | 8/1996 | | |
| JP | 09-317829 | 12/1997 | | |
| JP | (10-53957) A | * 2/1998 | ........ D06M/14/564 |
| JP | 2000-266129 | 9/2000 | | |
| JP | 2002-542078 | 12/2000 | | |
| JP | 2001-280425 | 10/2001 | | |
| JP | (2003-165645) A | * 6/2003 | ............ B65H/5/02 |
| WO | WO 00/63580 | 10/2000 | | |

* cited by examiner

Primary Examiner—Marcus Charles
(74) Attorney, Agent, or Firm—Nixon Peabody LLP

(57) ABSTRACT

A belt fabric which is provided at a part of a power transmission belt on which frictional forces act is formed by dipping into a rubber solution prepared by dissolving a non cross-linked hydrogenated nitrile rubber composition, mixed with a polyethylene powder having a molecular weight in excess of 1 million and an organic peroxide as a cross-linking agent, in a solvent.

4 Claims, 9 Drawing Sheets

FIG. 11

| | | EXAMPLE1 | EXAMPLE2 | EXAMPLE3 | EXAMPLE4 | EXAMPLE5 | EXAMPLE6 | EXAMPLE7 |
|---|---|---|---|---|---|---|---|---|
| FABRIC STRUCTURE | WARP | NYLON | NYLON | NYLON | NYLON | NYLON | NYLON | NYLON |
| | WEFT | NYLON | NYLON | NYLON | NYLON | NYLON | NYLON | NYLON |
| RUBBER COMPOSITION FOR RUBBER SOLUTION | ZINC METHACRYLATE ADDED H-NBR | | | | 80 | 80 | | 80 |
| | H-NBR | 100 | 100 | 100 | 20 | 20 | 100 | 20 |
| | CARBON BLACK | 50 | 50 | 50 | 20 | 20 | 50 | 20 |
| | MILLED CARBON FIBER | 30 | 30 | | | 30 | | |
| | ULTRA-HIGH MOLECULAR WEIGHT POLYETHYLENE POWDER | | | 10 | | | 10 | |
| | CROSS-LINKING GROUP | SULFUR | ORGANIC PEROXIDE | SULFUR | ORGANIC PEROXIDE | ORGANIC PEROXIDE | ORGANIC PEROXIDE | ORGANIC PEROXIDE |

| | | EXAMPLE8 | EXAMPLE9 | EXAMPLE10 | EXAMPLE11 | EXAMPLE12 | EXAMPLE13 | EXAMPLE14 |
|---|---|---|---|---|---|---|---|---|
| FABRIC STRUCTURE | WARP | ARAMID | ARAMID | ARAMID | ARAMID | ARAMID | ARAMID | ARAMID |
| | WEFT | NYLON | NYLON | NYLON | NYLON | NYLON | NYLON | NYLON |
| RUBBER COMPOSITION FOR RUBBER SOLUTION | ZINC METHACRYLATE ADDED H-NBR | | | | 80 | 80 | | 80 |
| | H-NBR | 100 | 100 | 100 | 20 | 20 | 100 | 20 |
| | CARBON BLACK | 50 | 50 | 50 | 20 | 20 | 50 | 20 |
| | MILLED CARBON FIBER | 30 | 30 | | | 30 | | |
| | ULTRA-HIGH MOLECULAR WEIGHT POLYETHYLENE POWDER | | | 10 | | | 10 | |
| | CROSS-LINKING GROUP | SULFUR | ORGANIC PEROXIDE | SULFUR | ORGANIC PEROXIDE | ORGANIC PEROXIDE | ORGANIC PEROXIDE | ORGANIC PEROXIDE |

FIG. 12

| | | UNIT | Ex.1 | Ex.2 | Ex.3 | Ex.4 | Ex.5 | Ex.6 | Ex.7 |
|---|---|---|---|---|---|---|---|---|---|
| COEFFICIENT OF FRICTION AGAINST CARBON STEEL(S45C) | | — | 0.52 | 0.55 | 0.42 | 0.96 | 0.45 | 0.35 | 0.29 |
| COEFFICIENT OF FRICTION AGAINST RESIN | | — | 0.61 | 0.65 | 0.45 | 0.88 | 0.54 | 0.38 | 0.33 |
| SYNCRONOUS BELT | AMOUNT OF ABRATION OF BELT FABLIC | g | 3.5 | 4.0 | 3.7 | 3.5 | 3.8 | 1.9 | 1.7 |
| | BELT TOOTH DURING LIFE | hours | 400 | 420 | 410 | 430 | 420 | 710 | 750 |
| | NOISE DURING BELT RUNNING | dB | 83 | 83 | 81 | 84 | 85 | 80 | 81 |
| HIGH LOAD POWER TRANSMISSION V-BELT | BLOCK INTERFITTING GROOVE CLEARANCE BEFORE RUNNING | mm | 3.03 | 3.03 | 3.03 | 3.03 | 3.03 | 3.03 | 3.03 |
| | BLOCK INTERFITTING PORTION THICKNESS BEFORE RUNNING | mm | 3.10 | 3.10 | 3.10 | 3.10 | 3.10 | 3.10 | 3.10 |
| | INTERFEFERENCE BEFORE RUNNING | mm | 0.07 | 0.07 | 0.07 | 0.07 | 0.07 | 0.07 | 0.07 |
| | BLOCK INTERFITTING GROOVE CLEARANCE AFTER RUNNING | mm | 3.06 | 3.05 | 3.04 | 3.05 | 3.08 | 3.03 | 3.04 |
| | BLOCK INTERFITTING PORTION THICKNESS AFTER RUNNING | mm | 2.80 | 2.75 | 2.75 | 2.77 | 2.80 | 2.90 | 2.95 |
| | INTERFEFERENCE AFTER RUNNING | mm | -0.26 | -0.30 | -0.29 | -0.28 | -0.28 | -0.13 | -0.09 |
| | NOISE DURING BELT RUNNING | dB | 95 | 95 | 92 | 95 | 96 | 90 | 89 |
| | NUMBER OF CRACKS OCCURRING IN TENSILE BAND | — | ≧30 | 25 | ≧30 | 20 | 28 | 5 | 7 |
| | BLOCK DURABLE LIFE | hours | 260 | 240 | 245 | 250 | 250 | ≧600 | ≧600 |
| | | UNIT | Ex.8 | Ex.9 | Ex.10 | Ex.11 | Ex.12 | Ex.13 | Ex.14 |
| COEFFICIENT OF FRICTION AGAINST CARBON STEEL(S45C) | | — | 0.59 | 0.59 | 0.42 | 0.96 | 0.45 | 0.35 | 0.29 |
| COEFFICIENT OF FRICTION AGAINST RESIN | | — | 0.64 | 0.65 | 0.45 | 0.88 | 0.54 | 0.38 | 0.33 |
| SYNCRONOUS BELT | AMOUNT OF ABRATION OF BELT FABLIC | g | 2.5 | 2.8 | 2.6 | 2.5 | 2.7 | 1.3 | 1.2 |
| | BELT TOOTH DURING LIFE | hours | 560 | 590 | 570 | 610 | 590 | 990 | 1050 |
| | NOISE DURING BELT RUNNING | dB | 87 | 88 | 86 | 87 | 88 | 83 | 82 |
| HIGH LOAD POWER TRANSMISSION V-BELT | BLOCK INTERFITTING GROOVE CLEARANCE BEFORE RUNNING | mm | 3.03 | 3.03 | 3.03 | 3.03 | 3.03 | 3.03 | 3.03 |
| | BLOCK INTERFITTING PORTION THICKNESS BEFORE RUNNING | mm | 3.10 | 3.10 | 3.10 | 3.10 | 3.10 | 3.10 | 3.10 |
| | INTERFEFERENCE BEFORE RUNNING | mm | 0.07 | 0.07 | 0.07 | 0.07 | 0.07 | 0.07 | 0.07 |
| | BLOCK INTERFITTING GROOVE CLEARANCE AFTER RUNNING | mm | 3.09 | 3.07 | 3.05 | 3.08 | 3.10 | 3.04 | 3.04 |
| | BLOCK INTERFITTING PORTION THICKNESS AFTER RUNNING | mm | 2.81 | 2.77 | 2.76 | 2.79 | 2.81 | 2.91 | 2.96 |
| | INTERFEFERENCE AFTER RUNNING | mm | -0.28 | -0.30 | -0.29 | -0.29 | -0.29 | -0.13 | -0.08 |
| | NOISE DURING BELT RUNNING | dB | 95 | 95 | 94 | 95 | 95 | 91 | 90 |
| | NUMBER OF CRACKS OCCURRING IN TENSILE BAND | — | 0 | 0 | 0 | 0 | 0 | 0 | 0 |
| | BLOCK DURABLE LIFE | hours | 310 | 300 | 305 | 315 | 320 | ≧600 | ≧600 |

BELT FABRIC, AND POWER TRANSMISSION BELT AND HIGH LOAD POWER TRANSMISSION V-BELT USING SUCH A BELT FABRIC

CROSS REFERENCE TO RELATED APPLICATION

This nonprovisional application claims priority under 35 U.S.C. §119(a) on patent application No. 2001-196917 filed in Japan on Jun. 28, 2001, the entire contents of which are hereby incorporated by reference.

BACKGROUND OF THE INVENTION

1. Field of the Invention

The present invention relates to a belt fabric which is provided at a part of a power transmission belt on which frictional forces act, to a power transmission belt using such a belt fabric, and to a high load power transmission V-belt using such a belt fabric.

2. Description of the Prior Art

Synchronous belts are belts of the type in which belt teeth are provided at specified pitches in the belt longitudinal direction and transmit power by meshing of the belt teeth with their cooperating pulleys. During power transmission by such a synchronous belt, a great frictional force acts on the belt teeth. In general, in a typical synchronous belt made of rubber, its belt tooth side surface is covered with a belt fabric in order to inhibit abrasion of the belt and chipping of the belt teeth due to such abrasion. Prior to molding of the belt, the belt fabric is subjected to dipping into a rubber solution prepared by dissolving a non cross-linked rubber composition in an organic solvent, and subsequently to drying, in order that the belt fabric may be given cushioning properties, adhesive properties to the belt main body, and other properties. Meanwhile, with a view to improving the heat resistance of the belt main body of the synchronous belt, besides the hydrogenated nitrile rubber (hereinafter "H-NBR") composition cross-linked by sulfur, other H-NBR compositions such as an organic peroxide cross-linked H-NBR composition, have been used as a rubber composition for belt main body formation. Further, with a view to enhancing the rigidity of the belt teeth thereby to improve the resistance to high load of the belt, H-NBR compositions of the organic peroxide cross-linking group reinforced by addition of zinc methacrylate have been used as a rubber composition for belt main body formation in recent years. With such improvement in the heat resistance of the belt main body, improvement also in the heat resistance of rubber ingredients deposited on the belt fabric as a result of dipping into a rubber solution has been required. To this end, a rubber solution of the type prepared by dissolving a non cross-linked H-NBR composition of the organic peroxide cross-linking group in an organic solvent may possibly be used.

Typical high load power transmission V-belts include an endless band having a tensile band main body formed of a rubber composition and a plurality of blocks each of which can be brought into engagement with the tensile band for fastening thereto so that the plurality of blocks are disposed side by side at intervals in the longitudinal direction of the tensile band, and power is transmitted by friction of the plurality of blocks against its cooperating pulleys. During such power transmission by the high load power transmission V-belt, friction forces will act on the upper and lower surfaces of the tensile band because of the back-and-forth rocking of the blocks. Therefore, such a high load power transmission V-belt is generally provided with a top fabric and a bottom fabric on the upper and lower surfaces of its tensile band, respectively, for inhibiting abrasion of the tensile band and block damage by block joltiness due to such abrasion of the tensile band. And, as in the aforesaid synchronous belt, the top and bottom fabrics are subjected to dipping into a rubber solution prepared by dissolving a non cross-linked rubber composition in an organic solvent, and subsequently to drying, prior to molding of a tensile band. Meanwhile, high load power transmission V-belts are usually used under extremely severe conditions (for example, sever temperature conditions). To cope with this, H-NBR compositions of the organic peroxide cross-linking group mixed with zinc methacrylate have been used as a rubber composition for forming a tensile band main body of the high load power transmission V-belt. And, with such enhancement in the performance of the tensile band main body, improvements in the heat resistance of rubber ingredients deposited on the top and bottom fabrics as a result of dipping into a rubber solution have been required. To this end, a rubber solution of the type prepared by dissolving a non cross-linked H-NBR composition of the organic peroxide cross-linking group in an organic solvent may possibly be used.

SUMMARY OF THE INVENTION

Accordingly, an object of the present invention is to provide: a belt fabric subjected to dipping into a rubber solution employing a non cross-linked H-NBR composition of the organic peroxide cross-linking group which is superior in heat resistance, wherein the belt fabric exhibits superior wear resistance; a power transmission belt using such a belt fabric; and a high load power transmission V-belt including a tensile band comprising a top fabric and/or a bottom fabric subjected to dipping into a rubber solution employing a non cross-linked H-NBR composition of the organic peroxide cross-linking group which is superior in heat resistance, wherein the top fabric and/or the bottom fabric exhibits superior wear resistance.

The present invention discloses a belt fabric which is provided at a part of a power transmission belt on which frictional forces act. And the belt fabric is characterized in that it (the belt fabric) is formed by dipping into a rubber solution prepared by dissolving a non cross-linked H-NBR composition, mixed with a polyethylene powder having a molecular weight in excess of 1 million and an organic peroxide as a cross-linking agent, in a solvent.

In a power transmission belt provided with a belt fabric of the type described above at a part thereof on which frictional forces will act, (i) a rubber ingredient deposited on the belt fabric is an H-NBR composition of the organic peroxide cross-linking group having excellent heat resistance, because of which the belt fabric itself comes to exhibit superior heat resistance, (ii) the polyethylene powder having a molecular weight in excess of 1 million contained in the rubber ingredient imparts lubricity, because of which the coefficient of friction of the belt fabric can be held low, (iii) in the course of cross-linking of the H-NBR composition by an organic peroxide, the polyethylene powder is cocross-linked and, as a result, the polyethylene becomes unseparably chemically integrated with the H-NBR composition, because of which the abrasion resistance of the belt fabric is considerably enhanced, (iv) the reduction of noise caused by running of the belt is achieved, and (v) the impact resistance of the belt is improved owing to impact absorbing properties of the polyethylene powder.

Here, the polyethylene powder having a molecular weight in excess of 1 million is a ultra-high molecular weight polyethylene. Such a ultra-high molecular weight polyethylene is a high polymer, therefore being extremely superior in abrasion resistance, lubricity, and impact resistance to usual high density polyethylenes having a molecular weight ranging from 200,000 to 300,000.

The H-NBR composition forming the rubber solution may be reinforced by addition of zinc methacrylate.

The organic peroxide by which the H-NBR composition forming the rubber solution is cross-linked is not limited to any particular one. For example, dicumylperoxide, di-t-butyl-peroxide, t-butyl-cumylperoxide, or the like may be used.

The solvent of the rubber solution is not limited to any particular one. Any H-NBR composition soluble solvent may be employed. For example, methyl ethyl ketone (hereinafter MEK) may be used.

The power transmission belt of the present invention employing the aforementioned belt fabric is not limited to any particular one. The power transmission belt of the present invention may be a V-belt or V-ribbed belt provided with a belt fabric on its belt back face and capable of pulley driving there or a synchronous belt provided with a belt fabric at its belt tooth side surface. A synchronous belt, having a synchronous belt main body provided with belt teeth which are formed at specified pitches in the belt longitudinal direction, transmits power by meshing of the belt teeth with pulleys, as a result of which extremely great frictional forces will act on the belt tooth side surface. Accordingly, for the case of synchronous belts, it is possible to obtain particularly remarkable effects of suppressing abrasion and reducing noise. This provides superior resistance to belt tooth chipping and achieves quiet running operation.

The rubber composition forming the belt main body of the power transmission belt is not limited to any particular one. For example, ethylene-propylene diene terpolymer rubber (EPDM) compositions, chloroprene rubber (CR) compositions, H-NBR compositions of the sulfur cross-linking group, H-NBR compositions of the organic peroxide cross-linking group, or the like may be used. In the case the belt main body is formed by an H-NBR composition of the organic peroxide cross-linking group, both rubber ingredients deposited on the belt main body and the belt fabric are superior in heat resistance, therefore making the entire belt superior in heat resistance. Further, the H-NBR composition constituting the belt main body may be reinforced by addition of at least one of zinc methacrylate and zinc acrylate.

The belt fabric is not limited to any particular one. For example, the belt fabric may be a woven fabric or knitted fabric made of nylon fiber, aramid fiber, or the like.

The present invention further discloses a high load power transmission V-belt, which comprises (a) an endless tensile band including a tensile band main body formed of a rubber composition and top and bottom fabrics provided on upper and lower surfaces of the tensile band main body, respectively, and (b) a plurality of blocks each of which can be brought into engagement with the tensile band for fastening thereto so that the plurality of blocks are disposed side by side at intervals in the longitudinal direction of the tensile band, for transmitting power by friction of the plurality of blocks against its cooperating pulleys. And at least one of the top and bottom fabrics is formed by dipping into a rubber solution prepared by dissolving a non cross-linked H-NBR composition, mixed with a polyethylene powder having a molecular weight in excess of 1 million and an organic peroxide as a cross-linking agent, in a solvent.

By virtue of the arrangement described above, the following advantages are attained. A rubber ingredient deposited on the top fabric and/or the bottom fabric is an H-NBR composition of the organic peroxide cross-linking group having superior heat resistance, because of which the heat resistance of the top fabric and/or the bottom fabric is enhanced. The polyethylene powder having a molecular weight in excess of 1 million contained in the rubber ingredient imparts lubricity, because of which the coefficient of friction of the top fabric and/or the bottom fabric can be held low. In the course of cross-linking of the H-NBR composition by an organic peroxide, the polyethylene powder is cocross-linked and, as a result, the polyethylene becomes unseparably chemically integrated with the H-NBR composition. Therefore, the abrasion resistance of the top fabric and/or the bottom fabric is considerably enhanced, and damage to the blocks and the occurrence of noise due to block backlash are inhibited.

The rubber composition forming the tensile band main body is not limited to any particular one. For example, ethylene-propylene diene terpolymer rubber (EPDM) compositions, chloroprene rubber (CR) compositions, H-NBR compositions of the sulfur cross-linking group, H-NBR compositions of the organic peroxide cross-linking group, or the like may be used. In the case the tensile band main body is formed by an H-NBR composition of the organic peroxide cross-linking group, both rubber ingredients deposited on the tensile band main body and the top fabric and/or the bottom fabric have superior heat resistance, therefore making the entire belt superior in heat resistance. Further, the H-NBR composition constituting the tensile band main body may be reinforced by addition of at least one of zinc methacrylate and zinc acrylate.

The top and bottom fabrics are not limited to any particular one. For example, they may be a woven fabric or knitted fabric made of nylon fibers, aramid fibers, or the like.

The polyethylene powder, the organic peroxide by which the H-NBR composition of the rubber solution is cross-linked, and the solvent of the rubber solution are the same as those employed to form the belt fabric of the present invention.

BRIEF DESCRIPTION OF THE DRAWINGS

FIG. 11 is a table showing components of test fabrics.

FIG. 12 is a table showing test results.

DETAILED DESCRIPTION OF THE PREFERRED EMBODIMENTS

Embodiments of the present invention will be described in detail with reference to the accompanying drawings.

First Embodiment

Synchronous Belt Construction

Figure 1:
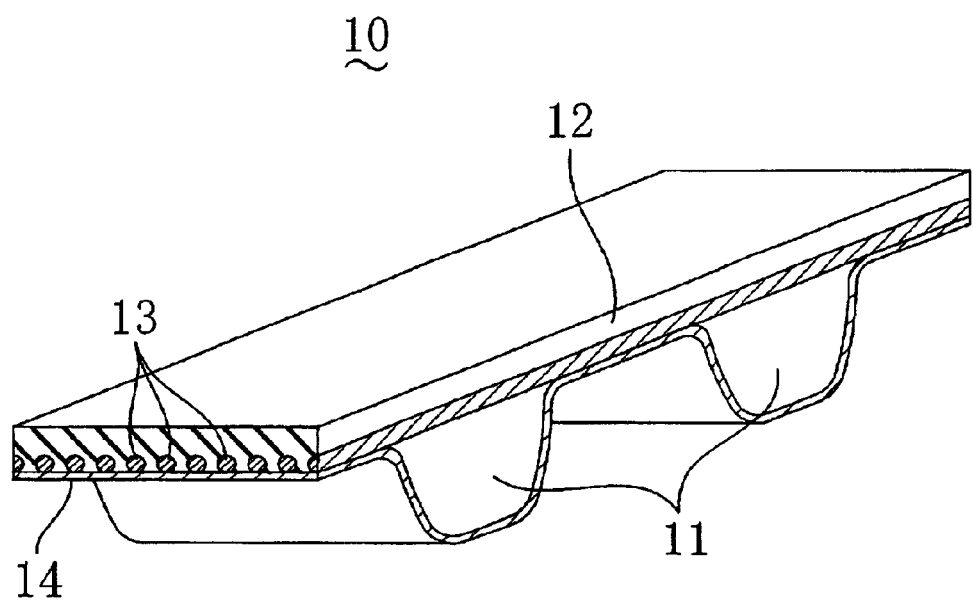
FIG. 1 is a perspective view of a synchronous belt according to a first embodiment of the present invention.

Referring to FIG. 1, there is shown a synchronous belt 10 according to a first embodiment of the present invention.

The main body of the synchronous belt 10 comprises belt teeth 11, 11, . . . which are provided on an inner peripheral surface thereof at specified pitches in the belt longitudinal direction, and a belt back face portion 12 on the side of the belt outer peripheral surface. A pair of cords 13 and 13 as a tension member integral with the belt main body are interposed, in double helical fashion, between the belt teeth 11, 11, . . . and the belt back face portion 12, extending substantially in the belt longitudinal direction and forming pitches in the belt width direction. And, a belt fabric 14 is affixed to the belt inner peripheral surface on the side of the belt teeth 11 so that the belt inner peripheral surface is covered by the belt fabric 14. The synchronous belt 10 transmits power by meshing of the belt teeth 11, 11, . . . with its cooperating pulleys.

The belt teeth 11 and the belt back face portion 12 are formed integrally with each other and made of an H-NBR composition which has been organic peroxide cross-linked by heat/pressure molding of a non cross-linked H-NBR composition mixed with dicumylperoxide which is an organic peroxide as a cross-linking agent and a filler such as carbon black as a reinforcing agent and reinforced by addition of a metallic salt monomer such as zinc methacrylate and zinc acrylate. This H-NBR composition of the organic peroxide cross-linking group is extremely superior in heat resistance and, in addition, high in elasticity as well as in strength. Therefore the modulus of elasticity of the belt teeth 11, 11, . . . is extremely high.

The cord 13 is formed in the following way. Firstly, a bundle of glass fibers coated with resorcinol formaldehyde latex (hereinafter RFL) is subjected to first twisting thereby to form a strand. Secondly, a plurality of such strands are subjected to final twisting in the opposite direction to the first twisting direction to form a glass cord. Finally, the surface of the glass cord is subjected to coating treatment with rubber cement to form the cord 13. And, the rubber cement applied on the surface of the cord 13 is brought into close contact with the RFL coating with which the glass fibers have been coated and is integrally joined to the belt main body by mutual diffusion between the rubber cement and the rubber composition of the belt main body taking place during molding by applying heat and pressure. Further, one of the pair of the cords 13 is first-twisted by S twisting while final-twisted by Z twisting. On the other hand, the other cord 13 is final-twisted by S twisting while first-twisted by Z twisting.

The belt fabric 14 is formed in the following way. An aramid woven fabric processed so as to have stretchability in the belt longitudinal direction is subjected to: dipping treatment with a rubber solution prepared by dissolving a non cross-linked H-NBR composition, mixed with a polyethylene powder having a molecular weight in excess of 1 million (1,000,000) and an organic peroxide such as dicumylperoxide as a cross-linking agent and reinforced by addition of a metallic salt monomer such as zinc methacrylate and zinc acrylate, in an organic solvent such as an MEK solvent; drying treatment; and coating treatment for applying a coating of adhesive rubber of a non cross-linked H-NBR composition of the organic peroxide cross-linking group on a surface of the aramid woven fabric on the side of the belt main body. As a result of such dipping into the rubber solution and drying, there is formed, on the surface of fibers constituting the aramid woven fabric, a layer of rubber having a thickness of from several tens of micrometers to several hundreds of micrometers. In the belt fabric 14, a rubber ingredient deposited by the rubber solution is cross-linked by an organic peroxide at the time of heat/pressure molding, and the organic peroxide cross-linked H-NBR composition mixed with the polyethylene powder having a molecular weight in excess of 1 million is deposited in the entire inside of the woven fabric from the woven fabric surface. Further, a rubber ingredient deposited by coating with the rubber cement is cross-linked by an organic peroxide at the time of the heat/pressure molding, and the belt fabric 14 is integrally joined to the belt main body by mutual diffusion taking place between the rubber ingredient and the rubber composition of the belt main body.

Method Of Manufacture for Synchronous Belt

Hereinafter, a method of manufacturing the synchronous belt 10 will be described.

Sheet-like Non Cross-linked H-NBR Composition Preparation Step

A non cross-linked H-NBR composition, reinforced by addition of a metallic salt monomer such as zinc methacrylate and zinc acrylate as a raw rubber material, is fed into a rubber mixing processor such as a Banbury mixer for mastication.

Subsequently, the non cross-linked H-NBR composition is mixed with an organic peroxide as a cross-linking agent (e.g., dicumylperoxide) and carbon black as a reinforcing agent and the mixture is subjected to kneading.

Thereafter, the non cross-linked H-NBR composition completely mixed with the materials is processed in the form of a sheet by a callender roll.

Cord Preparation Step

A bundle of glass fibers is dipped into an RFL solution and subsequently dried. Thereafter the glass fiber bundle is first-twisted in a specified direction to prepare a strand. At this time, both strands that have been first-twisted by S twisting and by Z twisting, respectively, are prepared.

Subsequently, a plurality of strands are collected together and subjected to final twisting in a direction opposite to the first twisting direction, to prepare a glass cord. That is, strands that have been first-twisted by S twisting are subjected to final twisting by Z twisting, whereas strands that have been first-twisted by Z twisting are subjected to final twisting by S twisting.

And the final-twisted glass cord is dipped into a rubber cement and subsequently dried. As a result, an adhesive rubber layer is formed on the surface of the glass cord to provide the cord 13.

Belt Fabric Preparation Step

Like the sheet-like non cross-linked H-NBR composition preparation step, a non cross-linked H-NBR composition, mixed with a polyethylene powder having a molecular weight in excess of 1 million and an organic peroxide (e.g., dicumylperoxide) as a cross-linking agent, is prepared by kneading. The mixture thus prepared is dissolved in an organic solvent such as for example an MEK solvent, for rubber solution adjustment. Further, similarly, adhesive rubber of a non cross-linked H-NBR composition of the organic peroxide cross-linking group is prepared by kneading. The adhesive rubber thus prepared is dissolved in an organic solvent such as for example an MEK solvent, for rubber cement adjustment.

Subsequently, the rubber solution is transferred into a treatment bath, and an aramid woven fabric (which will become a belt fabric 14) having stretchability in one direction is dipped into the treatment bath. As a result of such dipping, the aramid woven fabric is impregnated with the rubber solution. Thereafter, the aramid woven fabric is pulled up from the treatment bath and then dried. In order to facilitate deposition of the rubber ingredient, it is preferable that the belt fabric 14 be subjected to dipping treatment with an epoxy resin solution and subsequent drying treatment, and to dipping treatment with an RFL solution and subsequent drying treatment.

Thereafter, rubber cement is coated by using a knife coater or roll coater and dried so that a rubber cement layer is formed on one of the surfaces of the aramid woven fabric.

And the aramid woven fabric is processed into a cylindrical shape so that the side coated with the rubber cement is oriented to be an outside surface of the aramid woven fabric and the aramid woven fabric has stretchability in the circumferential direction. In the way described above, the belt fabric 14 is now prepared.

Material Setting Step

A cylindrical mold, in which grooves of belt tooth shape extending in the die axial direction are formed circumferentially at equal pitches, is covered by the cylindrically shaped belt fabric 14.

Next, a pair of cords 13, one of which has been final-twisted by S twisting and the other of which has been final-twisted by Z twisting, are wound around, in double helical fashion and at equal pitches, the belt fabric 14.

Subsequently, the non cross-linked H-NBR composition, which has been processed in the form of a sheet, is wound around the cords 13 a specified number of times.

In the way as described above, from the side of the die, the belt fabric 14, the cords 13, and the non cross-linked H-NBR composition are set, in layered fashion, on the circumferential surface of the cylindrical mold in that order.

Heat/Pressure Molding Step

The cylindrical mold, on which the materials have been set, is placed in a heater/pressurizer apparatus, and both the temperature and the pressure of the interior of the heater/pressurizer apparatus are set at specified values, respectively, and these conditions are held for a specified length of time. At this time, cross-linking of the non cross-linked H-NBR composition progresses and, at the same time, the non cross-linked H-NBR composition starts flowing and is forced into the grooves formed in the cylindrical mold, pressing against the belt fabric 14. As a result, the belt main body with the belt teeth 11, 11, 11, . . . is formed. Further, mutual diffusion between the rubber cement on the surface of the cords 13 and the belt main body causes the cords 13 to adhere integrally to the belt main body, and mutual diffusion between the rubber cement coated on the belt fabric's 14 surface on the side of the belt main body and the belt main body causes the belt fabric 14 to adhere integrally to the belt main body.

In the way as described above, a slab in the form of a cylinder is molded on the surface of the cylindrical mold.

Width Cut Step

The cylindrical mold is taken out of the heater/pressurizer apparatus. The cylindrical slab formed on the circumferential surface of the cylindrical mold is removed therefrom. The slab is cut into circular slices of specified width. As a result, the synchronous belt 10 is attained.

Operation and Effects

In the synchronous belt 10 having the above-described construction, the rubber ingredient deposited on the belt fabric 14 is an H-NBR composition of the organic peroxide cross-linking group having superior heat resistance. As a result, the heat resistance of the belt fabric 14 itself is improved and, in addition, the coefficient of friction of the belt fabric 14 is held low because of lubricity imparted by the polyethylene powder having a molecular weight in excess of 1 million which is contained in the rubber ingredient. In addition, at the time when the H-NBR composition is cross-linked by an organic peroxide, the polyethylene powder is cocross-linked and, as a result, the polyethylene becomes unseparably, chemically integrated, thereby considerably improving the abrasion resistance of the belt fabric 14. Besides, the noise occurring when the belt is running can be reduced, and further the synchronous belt 10 comes to exhibit outstanding impact resistance owing to the impact absorbing properties of the polyethylene powder.

Furthermore, all the rubber ingredients deposited on the belt main body and the belt fabric 14 are composed of an H-NBR composition of the organic peroxide cross-linking group. Therefore, the entire belt becomes extremely superior in heat resistance.

Second Embodiment

High Load Power Transmission V-belt Construction

Figure 2:
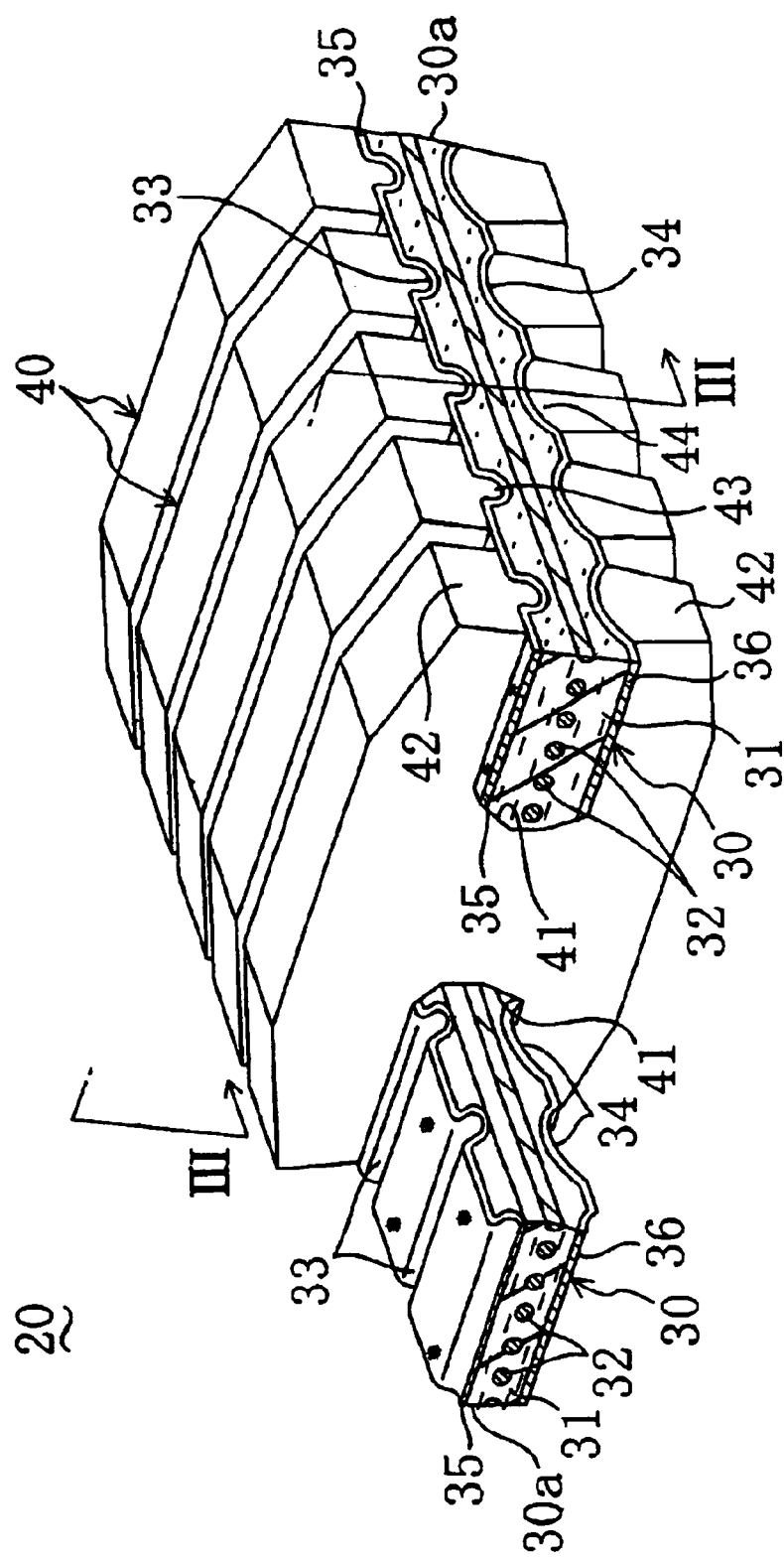
FIG. 2 is a perspective view of a high load power transmission V-belt according to a second embodiment of the present invention.

Referring now to FIG. 2, there is shown a high load power transmission V-belt 20 according to a second embodiment of the present invention.

The V-belt 20 of the second embodiment is made up of a pair of right and left endless tensile bands 30 and 30 and a large number of blocks 40, 40, . . . which are fastened in succession to the tensile bands 30 and 30 in the belt longitudinal direction.

Each tensile band 30 is formed by integral formation of a shape keeping rubber layer 31, cords 32 (which are formed in helical fashion in the shape keeping rubber layer 31) extending substantially in the length direction of the shape keeping rubber layer 31 and forming pitches in the width direction of the shape keeping rubber layer 31, and top and bottom fabrics 35 and 36 provided so as to cover the upper and lower surfaces of the shape keeping rubber layer 31. Further, groove-shaped, upper recessed portions 33, 33, . . . extending in the tensile band width direction correspondingly to each block 40 are formed in an upper surface of each tensile band 30, and lower recessed portions 34, 34, . . . extending in the tensile band width direction correspondingly to each upper recessed portion 33, 33, . . . are formed in a lower surface of each tensile band 30.

The shape keeping rubber layer 31, which is composed of an H-NBR composition which has been organic peroxide cross-linked by heat/pressure molding of a non cross-linked H-NBR composition mixed with an organic peroxide (e.g., dicumylperoxide) as a cross-linking agent and silica and organic short fiber such as nylon 6—6 fiber as a reinforcing agent and reinforced by addition of a metallic salt monomer such as zinc methacrylate and zinc acrylate, is a hard rubber superior in heat resistance and permanently unlikely to undergo deformation. As the hard rubber of the shape keeping rubber layer 31, rubber having a rubber hardness of more than 75 degrees (JIS hardness) may be used.

The cord 32 is formed by dipping twine or braid made of high-strength, high-modulus aramid fiber into an RFL solution and rubber cement and by drying it. And, the rubber cement on the surface of the cord 32 is brought into close contact with the RFL. During tensile band molding by applying heat and pressure, the rubber cement adheres integrally to the shape keeping rubber layer 31 by mutual diffusion with the shape keeping rubber layer 31.

The top and bottom fabrics 35 and 36 are each formed by dipping an aramid woven fabric so processed as to exhibit stretchability in the tensile band length direction into a rubber solution prepared by dissolving a non cross-linked H-NBR composition, mixed with a polyethylene powder having a molecular weight in excess of 1 million and an organic peroxide (e.g., dicumylperoxide) as a cross-linking agent and reinforced by addition of a metallic salt monomer (e.g., zinc methacrylate and zinc acrylate), into an organic solvent such as an MEK solvent, and by drying it. As a result of such dipping treatment with the rubber solution and drying treatment, there is formed, on the surface of fibers constituting the aramid woven fabric, a layer of rubber having a thickness of from several tens of micrometers to several hundreds of micrometers. And the rubber ingredients deposited by the rubber solution is organic peroxide cross-linked during tensile band molding by applying heat and pressure and the organic peroxide cross-linked H-NBR composition mixed with the polyethylene powder having a molecular weight in excess of 1 million is deposited entirely in the inside of the woven fabric from the woven fabric surface, and the top and bottom fabrics 35 and 36 each adhere integrally to the shape keeping rubber layer 31 by mutual diffusion with the shape keeping rubber layer 31.

On the other hand, each block 40 has, at its belt width direction right and left side portions, notch-like intermitting grooves 41 and 41 for allowing each tensile band 30 to removably interfit therein from aside. Further, each block 40 has, at its right and left side faces other than the interfitting grooves 41 and 41, abutting portions 42 and 42 which are brought into abutment with pulley groove faces. And, the tensile bands 30 and 30 are interfitted in the intermitting grooves 41 and 41 of each block 40, respectively, and the blocks 40 and 40 engage, in succession, the tensile bands 30 and 30 in the belt length direction for fastening thereto.

Formed on an upper wall face of each interfitting groove 41 in each block 40 is an upper projecting portion 43 of a convex bar which engages with its corresponding upper recessed portion 33 in the upper face of the tensile band 30. On the other hand, formed on a lower wall face of each interfitting groove 41 is a lower projecting portion 44 of a convex bar which engages with its corresponding lower recessed portion 34 in the lower face of the tensile band 30. These upper and lower projecting portions 43 and 44 are formed in parallel arrangement with each other. And, the upper and lower projecting portions 43 and 44 of each block 40 is brought into engagement with the upper and lower recessed portions 33 and 34 of the tensile band 30, respectively. As a result, the blocks 40, 40, . . . are fastened to the tensile bands 30 and 30 in the belt longitudinal direction.

Figure 3:
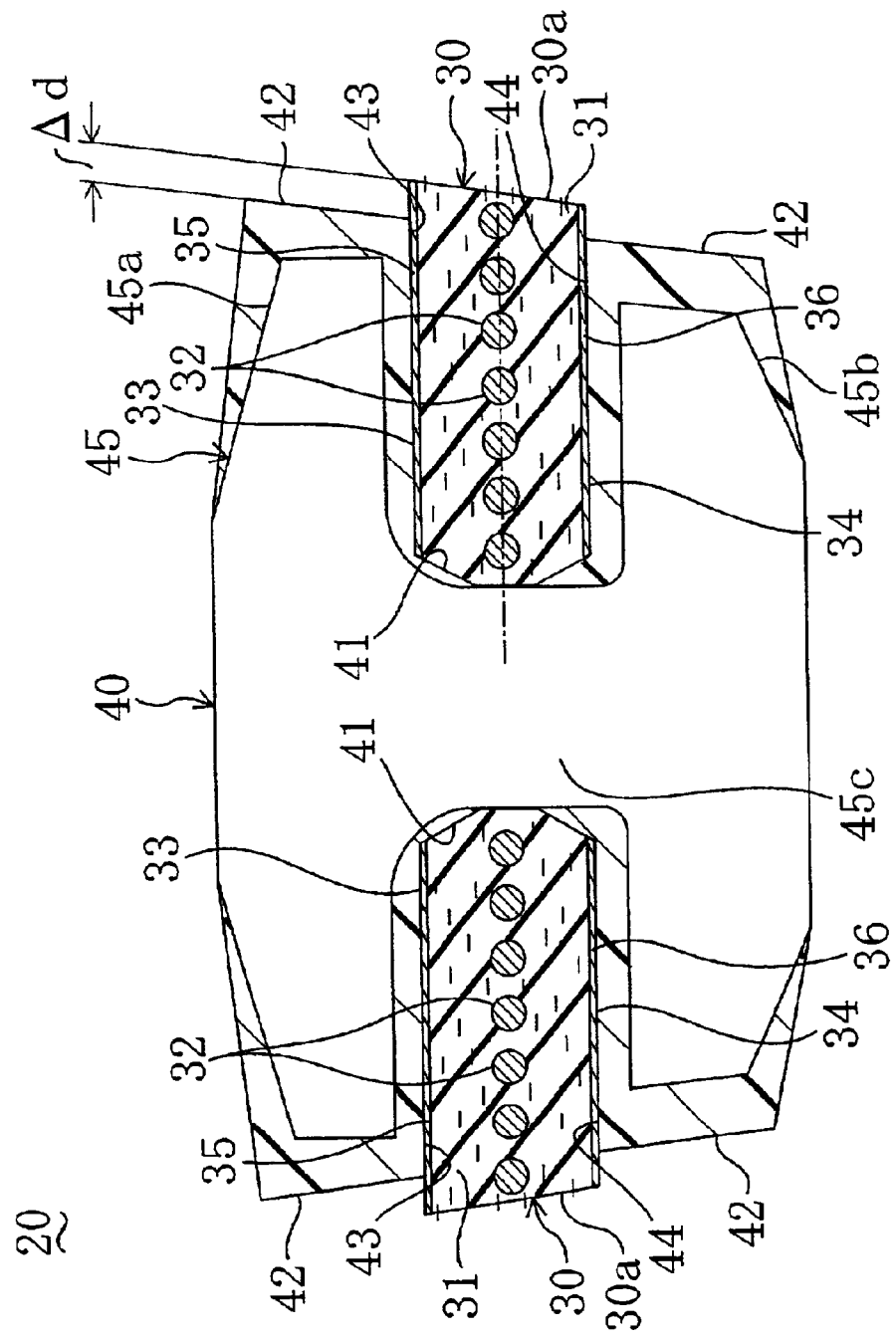
FIG. 3 is an enlarged cross-sectional view taken along the line III—III of FIG. 2.
Figure 4:
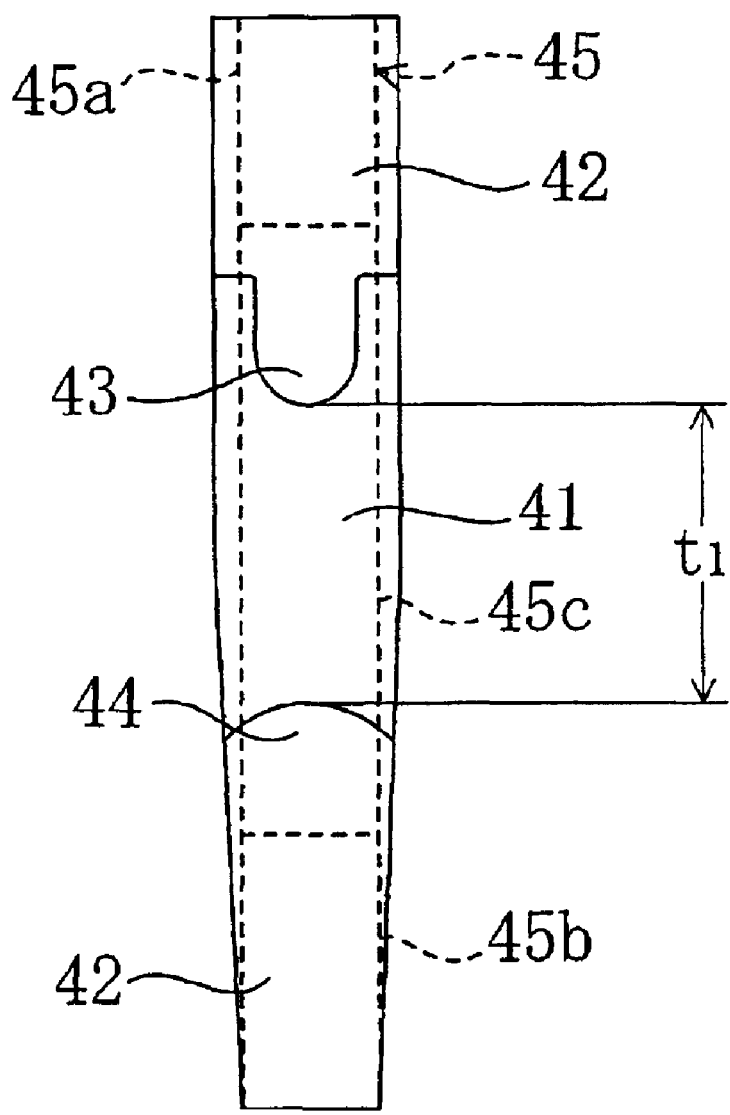
FIG. 4 is an enlarged side view of a block.

Each block 40 is composed of hard thermosetting phenolic resin material mixed with aramid short fibers, milled carbon fibers, and the like. In addition, as seen in FIGS. 3 and 4, embedded in the inside of the block 40 is a high-strength, high-modulus reinforcing member 45 formed of light aluminum alloy or the like. This reinforcing member 45 is located substantially centrally in the side of the block 40 in the block's 40 thickness direction. The reinforcing member 45 is embedded in the inside of the hard resin at the upper and lower projecting portions 43 and 44 (the portions that engage with the tensile band 30) and at the abutting portions 42 and 42 in the right and left side faces (the portions that are brought into abutment with the pulley groove faces), so that the reinforcing member 45 is not exposed at the surface of the block 40 (that is, these portions are composed of hard resin). However, the block 40 may be exposed at the surface of the block 40 in other portions.

The reinforcing member 45 is comprised of upper and lower beams 45a and 45b extending in the belt width direction (in the lateral direction) and a center pillar 45c for vertically connecting together laterally central portions of the beams 45a and 45b. The reinforcing member 45 is substantially H-shaped.

Figure 5:
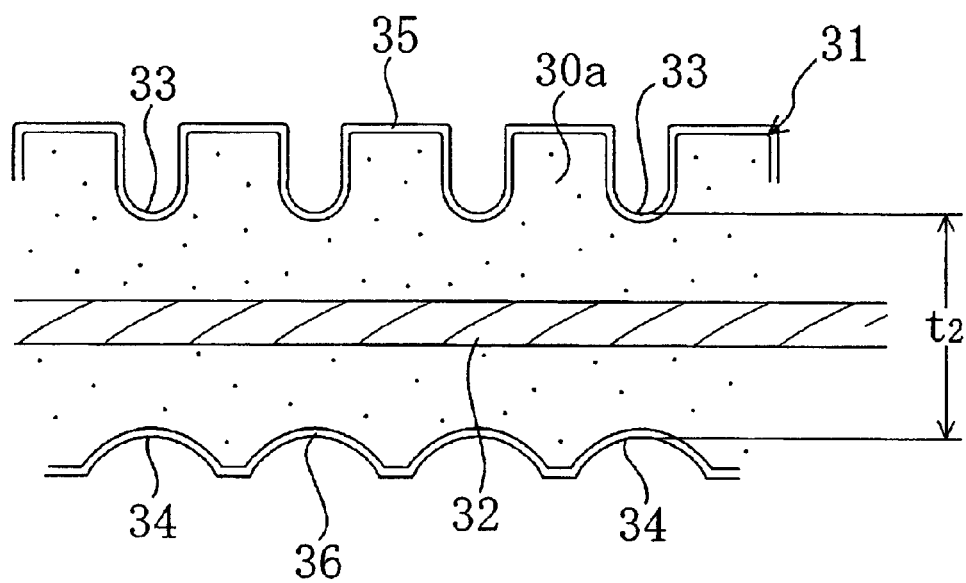
FIG. 5 is an enlarged side view of a tensile band.

Further, the engagement thickness t2 between the upper and lower projecting portions 33 and 34 of the tensile band 30 (i.e., the distance between the bottom face of the upper recessed portion 33 (more specifically the upper surface of the top fabric 35) and the bottom face of the lower recessed portion 34 (the lower surface of the bottom fabric 36) corresponding to the upper recessed portion 33 (see FIG. 5)), is set somewhat larger than the engagement gap t0 of the block 40 (i.e., the distance between the lower ends of the upper and lower projecting portions 43 and 44 of each block 40 (see FIG. 4)) by for example about 0.03 to 0.15 mm (t2 >t1). Because of this, at the time of assembling of each block 40 to the tensile band 30, the tensile band 30 is compressed by the block 40 in the thickness direction and assembled thereto, and the interference t2−t1(the initial press-fit margin of the tensile band 30 with respect to the block 40) is provided accordingly.

Further, as seen in FIG. 3, in each of the right and left pulley contact surfaces of the V-belt 20 a tension band side face 30a on the belt width direction outside is arranged to project beyond the surface of the resin abutting portion 42 of each block 40 to some extent (for example 0.03 to 0.15 mm). The projection margin Δd provided so that both the tension band side faces 30a and the abutting portions 42 (i.e., the block's 40 right and left side faces) are brought into contact with the pulley groove faces.

The projection margin Δd is intentionally provided so that the tension band side face 30a projects beyond the abutting portion 42 which is a side face of the block 40 when the V-belt 20 is assembled. The projection margin Δd can be changed freely by adjusting the pitch width of the tensile band 30 (the width in a plane passing through the cord 32) with respect to the insertion pitch width of the interfitting groove 41 which is an engagement portion of the block 40 (the groove depth at the position of the cord 32 of the tensile band 30 intermitted in the intermitting groove 41). Each tensile band 30 is inserted into the interfitting groove 41 of each block 40 by press fit. In order to perfect such press fit, it is required that the tensile band 30 be press fitted into the intermitting groove 41 at a force larger than the force that the V-belt 20 receives from the pulleys at the time of actual use. The projection margin Δd can be measured easily by scanning the lateral side faces of the V-belt 20 after assembly with a contour tracer.

And, each tension band side face 30a projects beyond the abutting portion 42 at the side face of each block 40, thereby defining the projection margin Δd . As a result, the tension band side face 30a, together with the abutting portion 42 at the side face of the block 40, comes into contact with the pulley groove face, so that the block 40 and the tensile band 30 receive in shares a lateral pressure from the pulley. The side portion 30a of the tensile band 30 lessens impact which is produced when each block 40 is plunged into a pulley groove.

Method of Manufacture for High Load Power Transmission V-belt

Hereinafter, a method of manufacture for the high load power transmission V-belt 20 will be described.

Sheet-Like Non Cross-Linked H-NBR Composition Preparation Step

A non cross-linked H-NBR composition, reinforced by addition of a metallic salt monomer such as zinc methacrylate and zinc acrylate as a raw rubber material, is fed into a rubber mixing processor such as a Banbury mixer for mastication.

Subsequently, the non cross-linked H-NBR composition is mixed with an organic peroxide as a cross-linking agent (e.g., dicumylperoxide), silica as a reinforcing agent, and a filler such as organic short fiber, and the mixture is subjected to kneading.

Thereafter, the non cross-linked H-NBR composition, which has been completely mixed with the materials, is processed in the form of a sheet by a callender roll.

Cord Preparation Step

Twine or braid made of aramid fiber is dipped into an RFL solution and subsequently dried. An arrangement may be made in which prior to adhesion treatment with an RFL solution the twine or braid is subjected to dipping into an epoxy solution and in an isocyanate solution and then to drying.

Next, the entirely RFL deposited twine or braid is dipped into rubber cement and then dried to form a cord 32.

Top and Bottom Fabrics Preparation Step

Like the sheet-like non cross-linked H-NBR composition preparation step, a non cross-linked H-NBR composition of the organic peroxide cross-linking group, mixed with a polyethylene powder having a molecular weight in excess of 1 million, is prepared by kneading. The mixture thus prepared is dissolved in an organic solvent such as an MEK solvent or the like, for rubber solution adjustment.

Subsequently, the rubber solution is transferred into a treatment bath, and an aramid woven fabric (which will become top and bottom fabrics 35 and 36) having stretchability in one direction is dipped into the treatment bath. As a result of such dipping, the aramid woven fabric is impregnated with the rubber solution. Thereafter, the aramid woven fabric is pulled up from the treatment bath and then dried. In order to facilitate deposition of the rubber ingredient, it is preferable that the top and bottom fabrics 35 and 36 be subjected to dipping treatment with an epoxy resin solution and subsequent drying treatment, and to dipping treatment with an RFL solution and subsequent drying treatment.

And the aramid woven fabrics are processed into a cylindrical shape so that the sides coated with the rubber cement are oriented to be outside surfaces of the aramid woven fabric and the aramid woven fabric has stretchability in the circumferential direction. In the way described above, the top and bottom fabrics 35 and 36 are now prepared.

Tensile Band Molding Step

A cylindrical mold, in which grooves of the shape of the lower recessed portion of the tensile band 30 which extend in the die axial direction are formed circumferentially at equal pitches, is covered with the bottom fabric 36, and a specified number of non cross-linked H-NBR composition layers each processed in the form of a sheet are formed overlying the bottom fabric 36.

Subsequently, the cylindrical mold is placed in a heater/pressurizer apparatus. The temperature and the pressure of the inside of the apparatus are set at specified values, respectively, and such conditions are maintained for a specified length of time so that cross-linking of the non cross-linked H-NBR composition progresses approximately to the extent of half. When the cross-linking of the non cross-linked H-NBR composition approximately half progresses, the shape of a lower half portion of the shape keeping rubber layer 31 is formed and, at the same time, the non cross-linked H-NBR composition starts flowing and is forced into the grooves formed in the cylindrical mold, pressing against the bottom fabric 36. As a result, the lower recessed portions 34, 34, . . . are formed.

Next, the cylindrical mold is taken out of the heater/pressurizer apparatus. The cords 32 are wound around, in helical fashion, on the half cross-linked H-NBR composition at equal pitches. A specified number of non cross-linked H-NBR composition layers each processed in the form of a sheet are provided on the cords 32. This is followed by covering these layers with the cylindrically shaped top fabric 35.

Next, the outermost layer is covered with a sleeve in which projecting bars having the shape of the upper recessed portion of the tensile band 30 and extending in the axial direction are formed circumferentially at equal pitches.

And, the cylindrical mold, on which the materials have been set, is placed in a heater/pressurizer apparatus, and both the temperature and the pressure of the interior of the heater/pressurizer apparatus are set at specified values, respectively, and such conditions are maintained for a specified length of time. At this time, cross-linking of the half and non cross-linked H-NBR compositions progresses and, at the same time, the non cross-linked H-NBR composition stars flowing and is forced into the grooves formed in the sleeve, pressing against the top fabric 35. As a result, the upper recessed portions 33, 33, and so on are formed and the shape keeping rubber layer 31 is formed. Further, mutual diffusion between the rubber cement on the surface of the cord 32 and the shape keeping rubber layer 31 causes the cord 32 to adhere integrally to the shape keeping rubber layer 31, and mutual diffusion between the rubber ingredients deposited on the top and bottom fabrics 35 and 36 and the shape keeping rubber layer 31 causes the top and bottom fabrics 35 and 36 to adhere integrally to the shape keeping rubber layer 31. In the way as described above, a cylindrical slab is formed on the surface of the cylindrical mold.

Finally, the cylindrical mold is taken out of the heater/pressurizer apparatus. The cylindrical slab formed on the circumferential surface of the cylindrical mold is removed therefrom. The slab is cut into circular slices of specified width. Each slice is subjected to chamfering or the like to form the tensile band 30.

Block Molding Step

A reinforcing member 45 made of aluminum is set in the inside of a cavity defined in a block molding die and thermosetting phenolic resin is injected thereinto, and the block 40 with the reinforcing member 45 inserted in the resin is formed.

Thereafter, the block 40 thus molded is subjected to various molding processes as necessity required for increasing its strength.

Assembly Step

The upper and lower recessed portions 33 and 34 of one of the tensile bands 30 located at the same position are brought into correspondence with the upper and lower projecting portions 43 and 44 of the block 40. The tensile band 30 is inserted in one of the intermitting grooves 41 of the block 40 so that the upper and lower projecting portions 43 and 44 are fitted into the upper and lower recessed portions 33 and 34, respectively. As a result, the block 40 is fastened to the tensile band 30. This operation is carried out along the entire periphery of the tensile band 30.

Next, the other tensile band 30 is inserted into the other intermitting groove 41 of the block 40 and the high load power transmission V-belt 20 is attained.

Operation and Effects

In the high load power transmission V-belt 20, the rubber ingredient deposited on the top and bottom fabrics 35 and 36 is an H-NBR composition of the organic peroxide cross-linking group superior in heat resistance. As a result, the heat resistance of the top and bottom fabrics 35 and 36 is improved and the coefficient of friction of the top and bottom fabrics 35 and 36 is held low because of lubricity given by a polyethylene powder having a molecular weight in excess of 1 million which is contained in the rubber ingredient. In addition, when the H-NBR composition is cross-linked by an organic peroxide, the polyethylene powder is cocross-linked and, as a result, the polyethylene becomes unseparably, chemically integrated, thereby considerably improving the abrasion resistance of the top and bottom fabrics 35 and 36. Besides, damage to the block 40 and noise due to backlash of the block 40 are inhibited.

Further, the shape keeping rubber layer 31 constituting the tensile band main body is also composed of an H-NBR composition of the organic peroxide cross-linking group. As a result, both the rubber ingredients deposited on the shape keeping rubber layer 31 and the top and bottom fabrics 35 and 36 exhibit superior heat resistance. Therefore, the entire V-belt 20 comes to have superior heat resistance.

Other Embodiments

The first and second embodiments of the present invention employ an H-NBR composition which constitutes a rubber solution and is reinforced by addition of zinc methacrylate or zinc acrylate, which should not be considered restrictive. Other H-NBR compositions without addition of zinc methacrylate or zinc acrylate may be used.

Further, the first embodiment is directed to a synchronous belt, which should not be considered restrictive. The present invention is applicable to a V-belt or V-ribbed belt provided with a belt fabric on its back face and capable of pulley driving at the back face.

Furthermore, in the first embodiment the cord 13 is composed of glass fiber, which should not be considered restrictive. The cord 13 may be composed of aramid fiber.

Further, both the rubber composition forming the belt main body of the synchronous belt 10 according to the first embodiment and the rubber composition forming the shape keeping rubber layer 31 constituting the tension band main body of the high load power transmission V-belt according to the second embodiment comprise an H-NBR composition of the organic peroxide cross-linking group, which should not be considered restrictive. Ethylene-propylene diene terpolymer rubber (EPDM) compositions, chloroprene rubber (CR) compositions, and H-NBR compositions of the sulfur cross-linking group may be used. Furthermore, the first and second embodiments employ an H-NBR composition of the organic peroxide cross-linking group reinforced by addition of zinc methacrylate or zinc acrylate, which should not be considered restrictive. Other H-NBR compositions that are not reinforced by addition of zinc methacrylate or zinc acrylate may be used.

Further, in the first and second embodiments the belt fabric 14 and the top and bottom fabrics 35 and 36 are each made of aramid fiber, which should not be considered restrictive. For example, these fabrics may be made of nylon fiber.

Test

Test Fabrics

Test fabrics for the following examples were prepared. Their componential details are also shown in FIG. 11.

EXAMPLE 1

A woven fabric, in which the weft yarn was woolie finish nylon twine and the warp yarn was nylon twine, was subjected to a dipping treatment in an epoxy resin solution and subsequent drying treatment, and to a dipping treatment in an RFL solution and subsequent drying treatment.

Meanwhile, a rubber solution was adjusted which was prepared by dissolving, in an MEK solvent, a non vulcanized H-NBR composition formed by kneading of 100 parts by mass of a non vulcanized H-NBR (ZETPOL 2020, a product of ZEON CORPORATION), 50 parts by mass of carbon black, 30 parts by mass of milled carbon fiber, and sulfur as a cross-linking agent. At this time, the non vulcanized H-NBR composition to MEK solvent mass ratio (i.e., H-NBR:MEK) was set at 1:5.

The nylon woven fabric was subjected twice to dipping into the rubber solution and subsequent drying, to prepare a test fabric of Example 1.

EXAMPLE 2

A test fabric of Example 2 was prepared. The Example 2 had the same structure as that of the Example 1, with the exception that an organic peroxide was used as a cross-linking agent in the non vulcanized H-NBR composition of the rubber solution.

EXAMPLE 3

A test fabric of Example 3 was prepared. The Example 3 had the same structure as that of the Example 1, with the exception that a rubber solution was used which was prepared by dissolving, in an MEK solvent, a non vulcanized H-NBR composition formed by kneading of 100 parts by mass of a non vulcanized H-NBR (ZETPOL 2020, a product of ZEON CORPORATION), 10 parts by mass of a ultra-high molecular weight polyethylene powder (MIPELON XM-220, a product of MITSUI CHEMICALS), and sulfur as a cross-linking agent.

EXAMPLE 4

A test fabric of Example 4 was prepared. The Example 4 had the same structure as that of the Example 1, with the exception that a rubber solution was used which was prepared by dissolving, in an MEK solvent, a non vulcanized H-NBR composition formed by kneading of 80 parts by mass of a non vulcanized H-NBR (ZSC 2295N, a product of ZEON CORPORATION) reinforced by addition of zinc methacrylate, 20 parts by mass of a non vulcanized H-NBR (ZETPOL 2020, a product of ZEON CORPORATION), 20 parts by mass of carbon black, and an organic peroxide as a cross-linking agent.

EXAMPLE 5

A test fabric of Example 5 was prepared. The Example 5 had the same structure as that of the Example 4, with the exception that the non vulcanized H-NBR composition of the rubber solution was mixed with 30 parts by mass of milled carbon fiber.

EXAMPLE 6

A test fabric of Example 6 was prepared. The Example 6 had the same structure as that of the Example 3, with the exception that an organic peroxide was used as a cross-linking agent in the non vulcanized H-NBR composition of the rubber solution.

EXAMPLE 7

A test fabric of Example 7 was prepared. The Example 7 had the same structure as that of the Example 4, with the exception that the non vulcanized H-NBR composition of the rubber solution was mixed with 10 parts of a ultra-high molecular weight powder (MIPELON XM-220, a product of MITSUI CHEMICALS).

EXAMPLE 8

A test fabric of Example 8 was prepared. The Example 8 had the same structure as that of the Example 1, with the exception that a woven fabric was used in which the weft yarn is a covering yarn formed by winding an aramid fiber (TECHNORA, a product of TEIJIN) around an urethane yarn to impart stretchability and the warp yarn is nylon twine.

EXAMPLE 9

A test fabric of Example 9 was prepared. The Example 9 had the same structure as that of the Example 2, with the exception that the same woven fabric as the one used in the Example 8 was employed.

EXAMPLE 10

A test fabric of Example 10 was prepared. The Example 10 had the same structure as that of the Example 3, with the exception that the same woven fabric as the one used in the Example 8 was employed.

EXAMPLE 11

A test fabric of Example 11 was prepared. The Example 11 had the same structure as that of the Example 4, with the exception that the same woven fabric as the one used in the Example 8 was employed.

EXAMPLE 12

A test fabric of Example 12 was prepared. The Example 12 had the same structure as that of the Example 5, with the exception that the same woven fabric as the one used in the Example 8 was employed.

EXAMPLE 13

A test fabric of Example 13 was prepared. The Example 13 had the same structure as that of the Example 6, with the exception that the same woven fabric as the one used in the Example 8 was employed.

EXAMPLE 14

A test fabric of Example 14 was prepared. The Example 14 had the same structure as that of the Example 7, with the exception that the same woven fabric as the one used in the Example 8 was employed.

Test Methods
Synchronous Belt Preparation

Fourteen types of synchronous belts employing the fabrics of the Examples 1–14, respectively, as belt fabrics each used to cover a belt tooth side surface were prepared in accordance with the method of the first embodiment. An H-NBR composition of the organic peroxide cross-linking group was used as a rubber composition for forming a belt main body comprised of belt teeth and a belt back face portion, and a glass cord subjected to an adhesion treatment with an RFL solution was used as a cord. The pitch of the belt teeth was set at 8 mm and the belt width was set at 10 mm.

High Load Power Transmission V-Belt Preparation

Fourteen types of high load power transmission V-belts employing the fabrics of the Examples 1–14, respectively, as top and bottom fabrics used to cover the top and bottom faces of a tensile band were prepared in accordance with the method of the second embodiment. An H-NBR composition of the organic peroxide cross-linking group, mixed with aramid short fiber (TECHNORA, a product of TEIJIN) and nylon short fiber and reinforced by addition of zinc methacrylate, was used as a shape keeping rubber layer of the tensile band, and a braid of aramid fibers (TECHNORA, a product of TEIJIN) subjected to an adhesion treatment was used as a cord. Each block was formed by compounding a reinforcing member composed of aluminum alloy and a phenol resin mixed with carbon fiber and aramid short fiber (TECHNORA, a product of TEIJIN). The belt angle was set at 26 degrees, the belt pitch width at 25 mm, the block pitch (in the belt length direction) at 3 mm, the block thickness at 2.95 mm, and the belt length at 612 mm.

Testing for Coefficient of Friction

Figure 6:
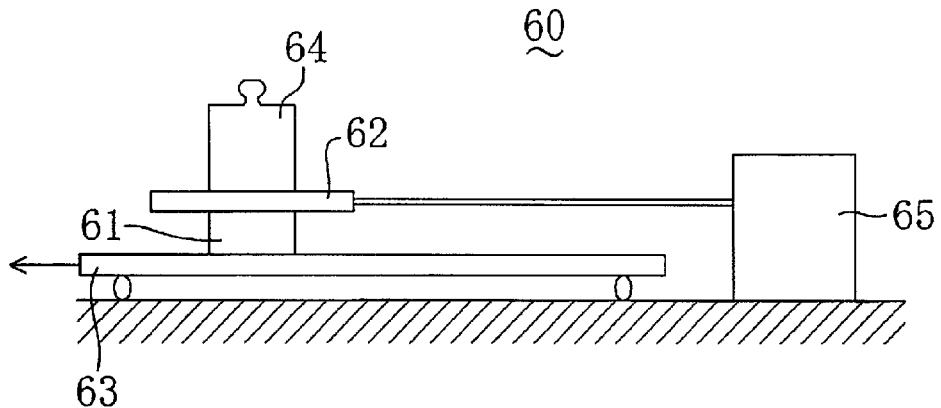
FIG. 6 is a diagram showing an arrangement of a coefficient-of-friction measuring apparatus.

The tests for measuring (i) the coefficient of friction between a belt tooth tip of each of the synchronous belts respectively employing the fabrics of Examples 1–14 and carbon steel (S45C) which has generally been used as pulley material and (ii) the coefficient of friction between a tensile band of each of the high load power transmission V-belts and the block forming resin were carried out with a coefficient-of-friction measuring apparatus 60 of FIG. 6.

In the first place, a specimen 61, i.e., a cut of a test synchronous belt, was fixedly adhered to a specimen fixture 62 with its teeth faced downward.

Thereafter, a belt tooth tip of the specimen 61 is brought into contact with a sliding plate 63 made of carbon steel (S45C) and a weight 64 was placed on the specimen fixture 62 to cause the belt teeth tip to press against the sliding plate 63.

Subsequently, the sliding plate 63 was moved in the direction indicated by an arrow of the figure. The belt tooth tip was slid on the surface of the sliding plate 63 for detection of a resistance load by a load cell 65 connected to the specimen fixture 62.

A coefficient of friction was calculated by dividing the resistance load by the mass of the weight 64.

Taking the specimen 61 and the sliding plate 63 as a tensile band of a high load power transmission V-belt and as a resin plate formed of phenol resin mixed with aramid fiber and nylon fiber used for block formation, coefficients of friction were calculated in the same way as described above.

Synchronous Belt Running Test
Testing for Fabric Abrasion Resistance

Figure 7:
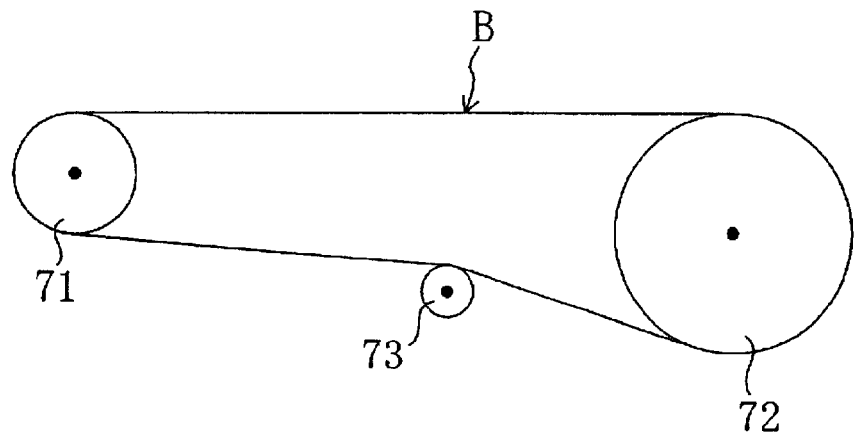
FIG. 7 is a diagram showing a layout of a belt running test apparatus for synchronous belt endurance testing.

The tests for evaluating the abrasion resistance of a belt fabric of each of synchronous belts B respectively employing the fabrics of Examples 1–14 with respect to a pulley made of carbon steel (S45C) were carried out by using a belt running test apparatus 70 (the layout of which is shown in FIG. 7).

Firstly, the mass of a synchronous belt B was measured.

Thereafter, the synchronous belt B was wound around the belt running test apparatus 70 made up of a driving pulley 71 provided with 21 pulley grooves at its pulley circumferential edge, a driven pulley 72 provided with 42 pulley grooves at its pulley circumferential edge, and an idler pulley 73 (whose pulley edge is flat) for pressing a back face of the belt, and a load was applied backwardly to the driven pulley 72 so that the belt was loaded with a tension of 216 N.

Subsequently, it was arranged such that the synchronous belt B was loaded with a tension of 550 N, and the synchronous belt B was run for 300 hours.

Then, the post-running mass of the synchronous belt B was measured.

The difference in mass between "before running" and "after running" was calculated as an amount of abrasion.

Testing for Belt Tooth Chipping Resistance

The tests for evaluating, as a belt tooth durable life, the length of belt running time elapsed until the occurrence of belt tooth chipping were carried out by subjecting each of synchronous belts employing the fabrics of Examples 1–14 respectively to running testing under the same conditions as those used in the abrasion resistance evaluating test.

Noise Test During Belt Running

Figure 8:
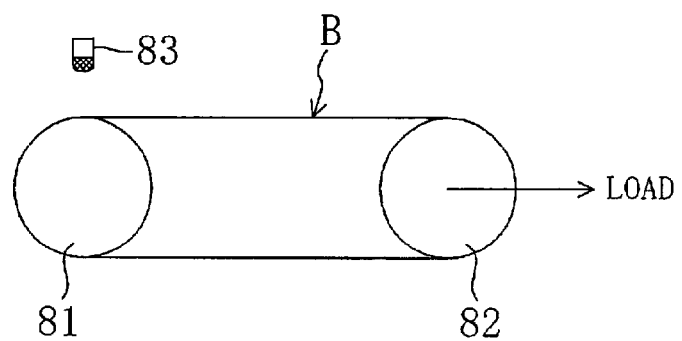
FIG. 8 is a diagram showing a layout of a belt running test apparatus for synchronous belt noise testing.

The tests for the evaluation of noise during running of each of synchronous belts B respectively employing the fabrics of Examples 1–14 were carried out by using a belt running test apparatus 80 (the layout of which is shown in FIG. 8).

In the first place, a synchronous belt B was wound around the belt running test apparatus 80 made up of a driving pulley 81 provided with 24 pulley grooves at its pulley peripheral edge and a driven pulley 82 provided with 24 pulley grooves at its pulley peripheral edge, and a load was applied backwardly to the driven pulley 82 so that the synchronous belt B was loaded with a constant tension.

Subsequently, the synchronous belt B was run while varying the number of revolutions of the driving pulley 81 in the range between 300 rpm and 5,000 rpm and the value of maxim noise was measured with a sound collecting microphone 83 disposed 300 mm above the driving pulley 81.

High Load Power Transmission V-Belt Running Test

Belt Durability Test

Figure 9:
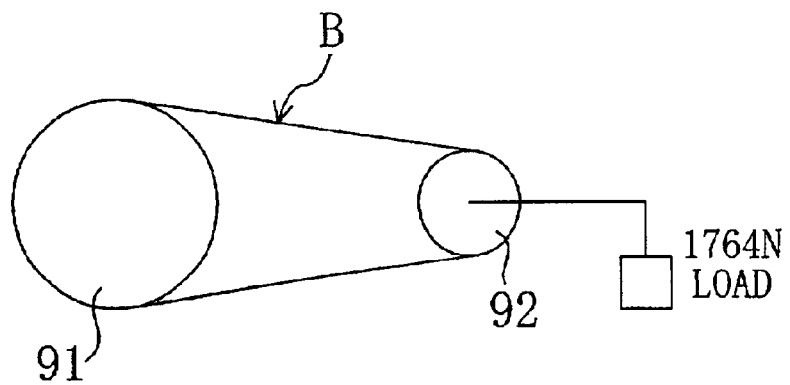
FIG. 9 is a diagram showing a layout of a belt running test apparatus for high load power transmission V-belt endurance testing.

The tests for evaluating, as a block durable life, the length of belt running time elapsed until the occurrence of damage to a block of each of high load power transmission V-belts B respectively employing the fabrics of Examples 1–14 were carried out by using a belt running test apparatus 90 (the layout of which is shown in FIG. 9).

In the first place, a V-belt B was wound around a driving pulley 91 (pitch diameter: 154 mm) mounted on the driving shaft as well as around a driven pulley 92 (pitch diameter: 65 mm) mounted on the driven shaft, and the driven pulley 92 was loaded backwardly with a load of 1,764 N.

Then, the driving pulley 91 was rotated at 5,000 rpm, and the V-belt B was run (belt velocity: 40.3 m per second), and the length of belt running time elapsed until the occurrence of block damage was measured.

Figure 10:
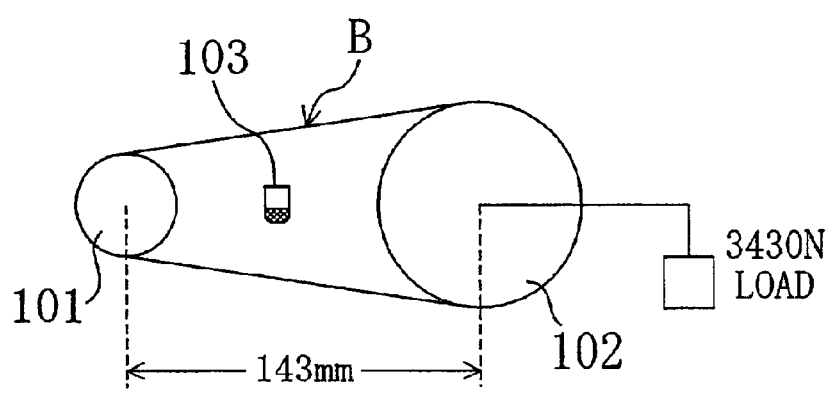
FIG. 10 is a diagram showing a layout of a belt running test apparatus for high load power transmission V-belt noise testing.

Variation in Interference Before and After Belt Running and Testing for Noise During Belt Running The tests for evaluating variations in the fabric interference of each of high load power transmission V-belts B (which employ, as tensile band top and bottom fabrics, the fabrics of Examples 1–14, respectively) between "before belt running" and "after belt running", and for evaluating noise during belt running were carried out by using a belt running test apparatus of FIG. 10.

In the first place, both the clearance of a block interfitting groove and the thickness between upper and lower recessed portions of a tensile band were measured and the difference therebetween was calculated as an initial interference.

Subsequently, the V-belt B was wound around a driving pulley 101 (pitch diameter: 65 mm) mounted on the driving shaft as well as around a driven pulley 102 (pitch diameter: 130 mm) mounted on the driven shaft, and the driven pulley 102 was loaded backwardly with a load of 3,430 N. The intershaft distance between the driving and driven pulleys was set at 143 mm.

Then, the driving pulley 101 was rotated at 2,600 rpm, and the V-belt B was run for 200 hours. The value of maximum noise collected by a sound collecting microphone 103 disposed between the driving pulley 101 and the driven pulley 102 was measured.

After such belt running, the interference was again calculated, and the number of cracks occurring in the tensile band was counted.

Test Results

The test results are shown in FIG. 12.

The fabric of the Example 1 employs a rubber solution of an H-NBR composition of the sulfur cross-linking group mixed with milled carbon fibers. The coefficient of friction between the Example 1 and carbon steel (S45C) is 0.52 and the coefficient of friction between the Example 1 and the block forming resin is 0.61. These results show that, in a synchronous belt employing the Example 1 as a belt fabric, the amount of abrasion of the belt fabric is relatively large resulting in a short belt tooth durable life and the noise during belt running is high. The results further show that, in a high load power transmission V-belt, both the amount of extension of the clearance of a block interfitting groove after belt running and the amount of reduction in the tensile band thickness are great resulting in a short block durable life, the noise during the belt running is high, and the number of cracks occurring in the tensile band after belt running is extremely large. The result that the degree of wear of the block and fabric of the high load power transmission V-belt was high may be due to wear of the resin of the block caused by carbon fibers contained in the rubber ingredients deposited on the top and bottom fabrics and to wear caused by the block sliding on the surfaces of the top and bottom fabrics. As a result, the fastening force of the block to the tensile band drops resulting in increasing the degree of freedom, due to which damage to the block is likely to occur and the noise increases. Further, it is assumed that the worsening of thermal degradation of the rubber ingredient deposited on the top and bottom fabrics may cause the tensile band to undergo a large number of cracks.

The fabric of the Example 2 is identical with the fabric of the Example 1, with the exception that the H-NBR composition of the rubber solution is cross-linked by an organic peroxide. However, in the high load power transmission V-belt, the number of cracks occurring in the tensile band after belt running is somewhat less than the Example 1. The reason for this may be explained by the fact that the rubber ingredient deposited on the fabric of the Example 2 was cross-linked by an organic peroxide and was therefore superior in heat resistance to the sulfur cross-linked rubber ingredient deposited on the fabric of the Example 1. The coefficient of friction with respect to carbon steel (S45C), the coefficient of friction with respect to block forming resin, and the test results for the synchronous belt and the high load power transmission V-belt are substantially the same as the Example 1. The results that, in the high load power transmission V-belt, (a) both the amount of extension of the block clearance after belt running and the amount of reduction in the tensile band thickness are great, (b) the block durable life is relatively short, and (c) the noise during the belt running is high may be due to wear of the block resin caused by carbon fibers contained in the rubber ingredients deposited on the top and bottom fabrics and to wear of the top and bottom fabrics caused by the block sliding thereon, as in the case of the Example 1.

The fabric of the Example 3 is identical with the fabric of the Example 1, with the exception that the H-NBR composition of the rubber solution is mixed not with carbon fibers but with a ultra-high molecular weight polyethylene powder. The test results show the following. Both the coefficient of friction with respect to carbon steel (S45C) and the coefficient of friction with respect to block forming resin are small in comparison with the fabrics of the Examples 1 and 2. The noise during the running of the synchronous belt is somewhat low in comparison with the fabrics of the Examples 1 and 2. This result may be due to the fact that such a ultra-high molecular weight polyethylene powder imparts lubricity. Further, in the synchronous belt, the amount of abrasion of the belt fabric is similar to that of the fabrics of the Examples 1 and 2. Therefore, the belt durable life is similar to that of the fabrics of the Example 1 and 2. On the other hand, in the high load power transmission V-belt, extension of the interfitting grooves due to block abrasion was inhibited. However, the amount of reduction in the tensile band thickness is similar to that of the fabrics of the Examples 1 and 2, which means that not only the block durable life but also the noise during the belt running is similar to that of the fabrics of the Examples 1 and 2. Further, the number of cracks occurring in the tensile band after the belt running was extremely large, as in the Example 1. The result that the fabrics of the synchronous belt and high load power transmission V-belt had undergone large amounts of abrasion may be due to the fact that polyethylene deposited on the fabrics did not become integrated with the H-NBR composition thereby becoming independent and separating therefrom.

The fabrics of the Examples 4 and 5 each employ a rubber solution formed of an H-NBR composition reinforced by addition of zinc methacrylate. The Example 4 was not mixed with carbon fiber, whereas the Example 5 was mixed with carbon fiber. The test results show the following. For the case of the Example 4, both the coefficient of friction with respect to carbon steel (S45C) and the coefficient of friction with respect to the block forming resin are high. On the other hand, for the case of the Example 5, both the coefficient of friction with respect to carbon steel (S45C) and the coefficient of friction with respect to the block forming resin are similar to those of the Examples 1–3. These results may be due to the fact that the rubber ingredient deposited on the fabric of the Example 4 contains therein no slide material such as carbon fiber. Further, for the case of the synchronous belt, the amount of abrasion is similar to that of the Examples 1–3. Therefore, the belt tooth durable life is similar to that of the Examples 1–3. Further, for the case of the high load power transmission V-belt, the amount of extension of the interfitting grooves due to block abrasion, the amount of reduction in the thickness of the tensile band due to abrasion thereof, the noise during the belt running, the block durable life, the number of cracks occurring in the tensile band are all similar to those of the Examples 1–3.

The fabric of the Example 6 is identical with the fabric of the Example 3, with the exception that the H-NBR composition of the rubber solution was cross-linked by an organic peroxide. The test results show the following. Like the Example 3, both the coefficient of friction with respect to carbon steel (S45C) and the coefficient of friction with respect to the block forming resin are small in comparison with the Examples 1 and 2. Further, the noise during the running of the synchronous belt is low in comparison with the Examples 1 and 2. Furthermore, unlike the Example 3, for the case of the synchronous belt, the amount of abrasion of the belt fabric is extremely small, because of which the belt tooth durable life is long. On the other hand, for the case of the high load power transmission V-belt, both the extension of the interfitting grooves due to block abrasion and the amount of reduction in the thickness of the tensile band due to abrasion thereof were controlled and the variation in interference between "before the belt running" and "after the belt running" is extremely small, and the noise during the belt running is low and the block durable life is extremely extended. Further, the number of cracks occurring in the tensile band is extremely small. The result that the abrasion of the fabric was low may be due to the fact that the H-NBR composition of the rubber solution was cross-linked by an organic peroxide and, during the cross-linking of the H-NBR composition, the polyethylene was cocross-linked so that it became unseparably, chemically integral with H-NBR.

The fabric of the Example 7 is identical with the fabric of the Example 4, with the exception that the H-NBR of the rubber solution was mixed with a ultra-high molecular weight polyethylene powder. The test results show the following. In comparison with the Example 4, both the coefficient of friction with respect to carbon steel (S45C) and the coefficient of friction with respect to the block forming resin are low. For the case of the synchronous belt, the amount of abrasion of the belt fabric is considerably reduced, because of which the belt tooth durable life is greatly extended. Further, the noise during the belt running is low. On the other hand, for the case of the high load power transmission belt, both the extension of the interfitting grooves due to block abrasion and the amount of reduction in the thickness of the tensile band due to abrasion thereof are small, because of which the variation in interference between "before the belt running" and "after the belt running" is small. As a result, the noise during the belt running is low, and the block durable life is longer more than twice that of the Example 4. Furthermore, the number of cracks occurring in the tensile band was greatly reduced.

The fabrics of the Examples 8–14 each employ aramid fiber. The Examples 8–14 correspond to the Example 1, to the Example 2, to the Example 3, to the Example 4, to the Example 5, to the Example 6, and to the Example 7, respectively. With the exception of the test results that no crack was found in the tensile band in each of the Examples 8–14 after the belt running, the other test results for the Examples 8–14 were similar to the test results for the Examples 1–7, respectively. For the case of the high load power transmission V-belt, the block resin would readily wear off if aramid fiber were employed for its top and bottom fabrics. Therefore, the use of top and bottom fabrics, dipped into a rubber solution prepared by dissolving a non cross-linked H-NBR composition of the organic peroxide cross-linking group mixed with a polyethylene powder in an MEK solvent, provides extremely excellent effects.

What is claimed is:

1. A high load power transmission V-belt, which comprises (a) an endless tensile band including a tensile band main body formed of a rubber composition and top and bottom fabrics provided on upper and lower surfaces of said tensile band main body, respectively, and (b) a plurality of blocks disposed side by side at intervals in the longitudinal direction of said tensile band each block being brought into engagement with said tensile band on which said top and bottom fabrics are in contact with each said block, for transmitting power by friction of said plurality of blocks against pulleys, wherein at least one of said top and bottom fabrics is made of a fabric subjected to a dipping treatment with a rubber solution prepared by dissolving a non cross-linked hydrogenated nitrile rubber composition, mixed with a polyethylene powder having a molecular weight in excess of 1 million and an organic peroxide as a cross-linking agent, in a solvent in order to increase abrasion resistance while reducing noise generation and heat generation between said fabric and said blocks at said contact such that the life of said blocks is substantially increased.

2. The high load power transmission V-belt of claim 1, wherein at least one of zinc methacrylate and zinc acrylate is added to said non cross-linked hydrogenated nitrile rubber composition of said rubber solution.

3. The high load power transmission V-belt of claim 1, wherein said rubber composition forming said tensile band main body is a hydrogenated nitrile rubber composition cross-linked by an organic peroxide.

4. The high load power transmission V-belt of claim 3, wherein at least one of zinc methacrylate and zinc acrylate is added to said organic peroxide cross-linked hydrogenated nitrile rubber composition constituting said tensile band main body.

* * * * *

UNITED STATES PATENT AND TRADEMARK OFFICE
CERTIFICATE OF CORRECTION

PATENT NO. : 6,942,590 B2  Page 1 of 1
APPLICATION NO. : 10/166249
DATED : September 13, 2005
INVENTOR(S) : Shigeki Okuno et al.

It is certified that error appears in the above-identified patent and that said Letters Patent is hereby corrected as shown below:

Title Page;

(73) "Bando Chemical Industries, Inc., Kobe (JP)" should read
-- Bando Chemical Industries, *Ltd.*, *Hyogo* (JP) --.

Signed and Sealed this

Twenty-third Day of December, 2008

JON W. DUDAS
*Director of the United States Patent and Trademark Office*